United States Patent [19]
Gilbertson

[11] Patent Number: 6,166,076
[45] Date of Patent: *Dec. 26, 2000

[54] TASTE ENHANCING FOOD ADDITIVES

[75] Inventor: Timothy A. Gilbertson, St. Amant, La.

[73] Assignee: Board of Supervisors of Louisiana State University and Agricultural and Mechanical College, Baton Rouge, La.

[*] Notice: This patent issued on a continued prosecution application filed under 37 CFR 1.53(d), and is subject to the twenty year patent term provisions of 35 U.S.C. 154(a)(2).

[21] Appl. No.: 08/987,494

[22] Filed: Dec. 9, 1997

Related U.S. Application Data

[60] Provisional application No. 60/088,355, Dec. 13, 1996.

[51] Int. Cl.$^7$ .................. A61K 31/185; A61K 31/20; A61K 31/21; A61K 33/42
[52] U.S. Cl. ................... 514/553; 514/560; 514/506; 424/571; 426/601; 426/534
[58] Field of Search .................... 426/601, 534; 514/553, 560, 506; 424/571

[56] References Cited

U.S. PATENT DOCUMENTS

| | | | |
|---|---|---|---|
| 4,146,501 | 3/1979 | Henkin | 252/408 |
| 4,670,285 | 6/1987 | Clandinin et al. | 426/602 |
| 4,879,312 | 11/1989 | Kamarei | 514/560 |
| 4,942,054 | 7/1990 | Winter et al. | 426/611 |
| 4,956,193 | 9/1990 | Cain | 426/576 |
| 5,013,569 | 5/1991 | Rubin | 426/585 |
| 5,064,677 | 11/1991 | Cain et al. | 426/611 |
| 5,151,291 | 9/1992 | Tokairin | 426/581 |
| 5,158,796 | 10/1992 | Bernhardt et al. | 426/549 |
| 5,223,285 | 6/1993 | DeMichele et al. | 426/72 |
| 5,268,186 | 12/1993 | Moskowitz | 426/93 |
| 5,314,707 | 5/1994 | Kester et al. | 426/611 |
| 5,397,591 | 3/1995 | Kyle et al. | 426/602 |
| 5,405,617 | 4/1995 | Gowan, Jr. et al. | 424/464 |
| 5,419,925 | 5/1995 | Selden et al. | 426/611 |
| 5,457,130 | 10/1995 | Tisdale | 514/560 |
| 5,508,307 | 4/1996 | Horrobun | 514/560 |
| 5,518,753 | 5/1996 | Bracco et al. | 426/601 |
| 5,827,885 | 10/1998 | Cook | 514/560 |
| 5,827,897 | 10/1998 | Aihaud | 514/725 |
| 5,837,733 | 11/1998 | Pariza | 514/560 |
| 5,861,399 | 1/1999 | Seed | 514/560 |

OTHER PUBLICATIONS

J.A. Nasser et al., "PROP Taster Status and the Ability to Detect the Presence of Added Conjugated Linoleic Acid in High Fat Ice Cream," Obesity Research, vol. 7, suppl. 1, p. 87S, Nov. 1, 1999.

Akoh, "Lipid–Based Fat Substitutes," Critical Reviews in Food Science and Nutrition, vol. 35(5), pp. 405–430 (1995).

Drewnowski et al., "Food Preferences in Human Obesity: Carbohydrates Versus Fats," Appetite, vol. 18, pp. 207–221 (1992).

Ramirez, "Chemoreception for Fat: Do Rats Sense Triglycerides Directly?," Appetite, vol. 18, pp. 193–206 (1992).

Hamosh et al., "Lipolytic Activity of Human Lingual Glands (Ebner)," Laboratory Investigation, vol. 37, pp. 603–608 (1977).

Gilbertson, "The Physiology of Vertebrate Taste Reception," Current Opinion in Neurobiology, vol. 3, pp. 532–537 (1993).

Ordway et al., "Direct Regulation of Ion Channels by Fatty Acids," Trends in Neuroscience, vol. 14(3), pp. 96–100 (1991).

Honoré et al., "External Blockade of the Major Cardiac Delayed Rectifier $K^+$ Channel (Kv1.5) by Polyunsaturated Fatty Acids," Proceedings of the National Academy of Science, USA, vol. 91, pp. 1937–1941 (1994).

Kinnamon, "Role of $K^+$ Channels in Taste Transduction," in Sensory Transduction, Rockefeller Univ. Press, pp. 261–270 (1992).

Bigiani et al., "Membrane Properties and Cell Ultrastructure of Taste Receptor Cells in Necturus Lingual Slices," Journal of Neurophysiology, vol. 75, pp. 1944–1956 (1996).

Gilbertson et al., "Fatty Acid Modulation of $K^+$ Channels in Taste Receptor Cells: Gustatory Cues for Dietary Fat," submitted to American Journal of Physiology: Cell Physiology, 1996.

S. Mirsky, "Anti Gravity: Chewing the Fat," Scientific American, Jan. 1997, p. 31 (1997).

R.D. Mattes, "Oral Fat Exposure Alters Postprandial Lipid Metabolism in Humans," American Journal of Clinical Nutrition, vol. 63, pp. 911–917 (1996).

*Primary Examiner*—Theodore J. Criares
*Attorney, Agent, or Firm*—Bonnie J. Davis; John H. Runnels

[57] ABSTRACT

Cis-polyunsaturated fatty acids stimulate taste receptor cells in the mouth. The addition of free fatty acids to foods, such as low calorie fat substitutes or sugar substitutes, can make the foods more palatable. Certain ion channels in taste receptor cells are directly sensitive to extracellular applications of free fatty acids. Free fatty acids inhibit the "delayed rectifying potassium channel" in taste receptor cells. Fatty acids exhibiting these properties are those having at least two double bonds, at least one of which is in the cis confirmation, i.e., cis-polyunsaturated fatty acids. The time for taste receptor cells to return to the "resting" state is longer following fatty acid stimulation than for other taste stimuli, thus increasing the taste receptor cell sensitivity to other stimuli, i.e., sugar or other sweet stimuli.

20 Claims, No Drawings

TASTE ENHANCING FOOD ADDITIVES

This application claims the benefit of U.S. Provisional Application Ser. No. 60/088,355, filed Dec. 13, 1996.

The development of this invention was partially funded by the Government under grant NIH/DC02507 awarded by the National Institutes of Health. The Government may have certain rights in this invention.

The palatability of food is based on many features, including its texture, flavor, odor, and taste. The odor (smell or aroma) of food is sensed through neurons in the nasal epithelium. The taste of food is sensed through chemoreceptors in the mouth that are neuro-epithelial cells. The "flavor" of food refers to its smell or aroma, or sometimes to elements of food that depend on the co-operation of the taste and smell receptors. Conventional wisdom has long held that humans have taste cells that respond only to salty, sweet, sour, and bitter stimuli.

To help with the growing problem of obesity, low-calorie food substitutes have recently been developed. Approximately 38% of the total calories consumed by most Americans come from fats and oils. Several low-calorie fat substitutes have been developed, both indigestible and partially digestible. See Akoh, "Lipid-Based Fat Substitutes," Critical Reviews in Food Science and Nutrition, Vol. 35(5), pp. 405–430 (1995). One example of a nondigestible fat substitute is olestra, a sucrose polyester. Other fat substitutes use carbohydrate polyesters or polyol polyesters, often with triglycerides added. The acceptability of fat substitutes depends on their palatability. Because the palatability of fats has previously been assumed to be based on their texture only, the emphasis of workers in this field has been on mimicking the texture of fat, both as a cooking oil and as a food additive. However, these fat substitutes still are not entirely acceptable to the general public because they do not "taste" right.

A characteristic of human obesity and the "binge-eating" syndrome is compulsive overeating of sweet and high-fat foods. Obese women will often preferentially choose less sweet food that is higher in fat. Human psychophysical studies have demonstrated a correlation between fat content and the intensity of and ultimately the hedonics of the sweetness of sweet/fat mixtures, suggesting that fat may influence the sensation of sweetness. See Drewnowski et al., "Food Preferences in Human Obesity: Carbohydrates Versus Fats," Appetite, Vol. 18, pp. 207–221 (1992).

The oral-nasal sensory properties of fats have received comparatively little attention. Those studies that have investigated these questions have focused almost exclusively on the textural cues of fats or on chemosensory cues from decomposed triglycerides or from fat impurities. See Ramirez, "Chemoreception for Fat: Do Rats Sense Triglycerides Directly?" Appetite, Vol. 18, pp. 193–206 (1992). Ramirez also reported that rats display a preference for triglycerides containing unsaturated fatty acids, while they are indifferent to those containing only saturated fatty acids.

Free fatty acids (FFAs) are a digestion product of triglycerides. FFAs may be produced in the mouth by the enzyme lingual lipase, although conventional wisdom holds that fat digestion by lingual lipase occurs primarily in the stomach. See Hamosh et al., "Lipolytic Activity of Human Lingual Glands (Ebner)," Laboratory Investigation, Vol. 37, pp. 603–608 (1977).

Taste receptor cells (TRCs) on the tongue respond to a variety of sapid molecules corresponding to the basic tastes of salty, sour, sweet, and bitter. The transduction of compounds representing these tastes involves several mechanisms that act on ion channels or receptors in TRCs. See Gilbertson, "The Physiology of Vertebrate Taste Reception," Current Opinion in Neurobiology, Vol. 3, pp. 532–37 (1993). The activation of potassium channels in a taste receptor cell can send a signal to the brain, by decreasing the amplitude and duration of an action potential. A major potassium channel that modulates the membrane polarization state is the delayed rectifier $K^+$ channel. See also Kinnamon, "Role of $K^+$ Channels in Taste Transduction," in Sensory Transduction, Rockefeller Univ. Press, pp. 261–270 (1992). In rat TRCs another potassium channel, the $K_{ir}$ channel, is important both for preventing the shunting of depolarizing current from a stimulus and in establishing the resting potential. See Bigiani et al., "Membrane Properties and Cell Ultrastructure of Taste Receptor Cells in Necturus Lingual Slices," Journal of Neurophysiology, Vol. 75, pp. 1944–1956 (1996).

Fatty acids are known to act as messenger molecules that regulate ion channels in certain internal body tissue cells. Cultured rat neurons and cardiac atrial cells are the only tissue cells that have previously been reported to respond solely to cis-polyunsaturated fatty acids. These cardiac cells responded to arachidonic acid applied extracellularly. See Ordway et al., "Direct Regulation of Ion Channels by Fatty Acids," Trends in Neuroscience, Vol. 14(3), pp. 96–100 (1991); Honoré et al., "External Blockade of the Major Cardiac Delayed Rectifier $K^+$ Channel (Kv1.5) by Polyunsaturated Fatty Acids," Proceedings of the National Academy of Science, USA, Vol. 91, pp. 1937–1941 (1994).

U.S. Pat. No. 5,419,925 describes reduced calorie fat compositions comprising polyol polyesters and reduced calorie triglycerides that provide textural and taste benefits.

U.S. Pat. No. 5,405,617 describes a taste mask coating for pharmaceuticals composed of aliphatic or fatty acid esters.

U.S. Pat. No. 5,314,707 describes a frying and cooking oil made from polyol fatty acid polyesters and triglycerides, particularly polyols esterified with short chain fatty acids (those with fewer than fourteen carbon atoms).

U.S. Pat. No. 5,268,186 describes a heat-stable flavor composition of free fatty acids, stabilized by adding a multivalent metal compound. The composition was said to be useful in increasing flavor intensity without increasing obnoxious odors upon heating foods such as cheeses.

U.S. Pat. No. 5,158,796 describes an edible composition of low calorie fat material comprising sugar or sugar alcohol fatty acid polyesters whose texture is less waxy in the mouth and thus more palatable.

Although fats are recognized as contributing to the texture of foods, it has not been previously suggested that fats or fatty acids stimulate taste receptor cells in the mouth of mammals. In particular, it has never been suggested to add free fatty acids to food products to enhance the taste sensation, that is, the aspect of flavor sensed by taste buds.

It has been unexpectedly discovered that cis-polyunsaturated fatty acids actually stimulate taste receptor cells in the mouth. The addition of these free fatty acids to foods can make the foods, especially low calorie fat substitutes and sugar substitutes, more palatable. The cis-polyunsaturated fatty acids are preferably added to the food without contemporaneously adding a substantial amount of any saturated fatty acids.

It has been discovered that certain ion channels in taste receptor cells are directly sensitive to extracellular levels of certain fatty acids at a concentration between about 0.1 $\mu$M and about 100 $\mu$M, preferably between about 1 $\mu$M and about 10 $\mu$M, and most preferably at about 10 $\mu$M. Fatty acids exhibiting these properties are those having at least two double bonds, at least one of which in the cis confirmation, i.e., cis-polyunsaturated fatty acids.

These fatty acids inhibit the "delayed rectifying $K^+$ channel" in taste receptor cells, and thus enhance the taste of the food. The time for taste receptor cells to return to the "resting" state is longer following fat stimulation than for other taste stimuli, thus increasing the taste receptor cell sensitivity to other stimuli, i.e., sugar or other sweet stimuli. The target for the FFAs in taste receptor cells (TRCs) is apparently either the ion channels themselves, or a closely associated protein that regulates the function of the ion channels. FFAs are presumably generated naturally by the action of lipase on fats in the mouth. By contrast, esterified fatty acids were not found to modulate $K^+$ channels. The polar or charged carboxyl group on the fatty acid may play an important role in stimulating the TRCs.

The experimental data presented here is the first direct evidence that there is a gustatory (i.e. taste) cue for fats in mammals.

In rat TRCs, cis-polyunsaturated fatty acids inhibit the delayed rectifier $K^+$ channel. In a subset of cells the FFAs also activate $K_{ir}$, another channel that plays a role in intracellular signaling. The delayed rectifier $K^+$ channel is involved in the regulation of action potential firing in these cells. The delayed rectifier $K^+$ channel is also a target for sour, bitter, and sweet taste stimuli, either directly or indirectly.

It was found, for example, that 10 $\mu$M linoleic acid significantly enhanced stimulus-induced depolarization of TRCs. Taken together, these effects on $K^+$ channels in TRCs have the net effect of prolonging stimulus induced depolarization. The prolonged depolarization enhances the signal's ability to reach the sites of neurotransmitter release in the basolateral regions of the cell, and enhances the cell's ability to send a message to the brain. Thus FFAs can enhance the response of TRC's to taste stimuli other than fats.

Isolation of fungiform taste buds.

The addition of free cis-polyunsaturated fatty acids to foods enhances the sensation of taste.

The effects of free fatty acids ("FFAs") on taste buds isolated from rat fungiform papillae were examined to determine if a chemosensory (i.e. non-textural) cue for fats is located in the mouth. The methods used to isolate TRCs were generally as described in Behe et al., "Membrane Currents in Taste Cells of the Rat Fungiform Papilla: Evidence for Two Types of Ca Currents and Inhibition of K Currents by Saccharin," Journal of General Physiology, Vol. 96, pp. 1061–1084 (1990); Doolin et al., "Distribution and Characterization of Functional Amiloride-sensitive Sodium Channels in Rat Tongue," Journal of General Physiology, Vol. 107. pp. 545–554 (1996); and Gilbertson et al., "Proton Currents Through Amiloride-sensitive $Na^+$ Channels in Isolated Hamster Taste Cells: Enhancement by Vasopressin and cAMP," Neuron, Vol. 10, pp. 931–942 (1993). Taste receptor cells from isolated rat flingiform taste buds that exhibited voltage-activated $Na^+$ or $K^+$ channels, stable resting potentials near –60 mV, and the elongate morphology expected of receptor cells were tested with several FFAs for effects on voltage-activated $K^+$ channels, using whole-cell patch clamp recording.

Individual fungiform taste buds were isolated from the tongues of 2- to 5-month-old male Sprague-Dawley rats (Harlan Sprague Dawley, Indianapolis, Ind.). Animals were housed individually in polycarbonate cages with food (Purina #5001, Purina Mills, St. Louis, Mo.) provided ad lib. The room containing the rats was maintained at 21–23° C.

on a 0700–1900 h light-dark cycle. All animal care and experimental procedures were in accordance with National Institutes of Health guidelines, and were approved by the Institutional Animal Care and Use Committee of the Pennington Biomedical Research Center.

Tongues were removed from euthanized rats, and were immediately placed in ice-cold Tyrode's solution. To remove the lingual epithelium containing the taste buds from the underlying muscle layer, approximately 1.0 ml of Tyrode's solution containing 0.3 mg/ml collagenase A (Boehringer Mannheim Corp., Indianapolis, Ind.), 2.5 mg/ml dispase (grade II; Boehringer Mannheim) and 1.0 mg/ml trypsin inhibitor (type I-S; Sigma Chemical Co., St. Louis, Mo.) was injected below the epithelium. The injected tongue was placed in Ca—Mg free Tyrode's solution and bubbled with $O_2$ for 33–35 min. The lingual epithelium was removed and pinned serosal side up, allowing access to the taste buds. Fungiform taste buds were removed individually by gentle suction with a large, firepolished pipette (~200 $\mu$m diameter), and were plated onto Cell-Tak™-coated microscope slides (Collaborative Biomedical Prod., Bedford, Mass.) fitted with an O-ring which served as a recording chamber. Once plated, cells were perfused continually with Tyrode's or various test solutions. Taste buds isolated in this manner were used for up to 6 hours without any noticeable morphological or physiological decrement.

Solutions.

All chemicals were obtained from Sigma Chemical Corporation (St. Louis, Mo.) unless otherwise indicated. Normal extracellular solution (Tyrode's) contained (in mM): NaCl, 140; KCl, 5; $CaCl_2$, 1; $MgCl_2$, 1; HEPES (N-[2-hydroxyethyl] piperazine-N'-[2-ethanesulfonic acid), 10; glucose, 10; and sodium pyruvate, 10. The pH was adjusted to 7.40 with NaOH. In $Ca^{2+}$—$Mg^{2+}$ free Tyrode's solution, 2 mM BAPTA (1,2-bis(2-aminophenoxy) ethane-N,N,N',N'-tetraacetic acid) (Molecular Probes, Eugene, Oreg.) replaced $CaCl_2$ and $MgCl_2$. Other components were identical to Tyrode's solution. Intracellular (pipette) solution contained (in mM): KCl, 140; $CaCl_2$, 1 [free $Ca^{2+}$ was ~$10^{-8}$ M]; $MgCl_2$, 2; HEPES, 10; EGTA (ethylene glycol-bis($\beta$-aminoethylether)-N,N,N',N'-tetraacetic acid), 11; and ATP, 3. The pH was adjusted to 7.20 with KOH.

Free fatty acids (FFAs) were stored below –20° C. until the day of use, when they were dissolved in warm ethanol and diluted to final working concentrations in Tyrode's solution. Final ethanol concentrations in Tyrode's were below 0.1%; the ethanol had no effect on ionic currents in any TRCs. All FFAs were applied by bath perfusion. In some experiments, FFA-containing solutions were bubbled continuously with nitrogen to retard oxygenation. No significant differences were observed between experiments with nitrogen bubbling and those without; the data from these two conditions were therefore pooled. The specific FFAs tested are listed in Table 1.

TABLE 1

Structural characteristics of fatty acids used in the reported experiments.

Saturated fatty acids

| | |
|---|---|
| caproic acid | C6:0 |
| capric acid | C10:0 |
| lauric acid | C12:0 |
| myristic acid | C14:0 |
| palmitic acid | C16:0 |
| arachidic acid | C20:0 |

TABLE 1-continued

Structural characteristics of fatty acids used in the reported experiments.

Unsaturated fatty acids

| | | |
|---|---|---|
| palmitoleic acid | C16:1, n-9 | Δ9 |
| oleic acid | C18:1, n-9 | Δ9 |
| linoleic acid | C18:2, n-6 | Δ9, 12 |
| linolelaidic acid | trans, trans-C18:2, n-6 | Δ9, 12 |
| linolenic acid | C18:3, n-6 | Δ6, 9, 12 |
| linolenelaidic acid | trans, trans, trans C18:3, n-9 | Δ9, 12, 15 |
| arachidonic acid | C20:4, n-6 | Δ5, 8, 11, 14 |
| eicosapentaenoic acid | C20:5, n-3 | Δ5, 8, 11, 14, 17 |
| erucic acid | C22:1, n-9 | Δ13 |
| docosahexaenoic acid | C22:6, n-3 | Δ4, 7, 10, 13, 16, 19 |
| nervonic acid | C24:1, n-9 | Δ15 |

Nomenclature refers to number of carbons:number of double bonds, n refers to the position of the first double bond relative to the methyl end and Δ refers to the positions of the double bonds relative to the carboxyl carbon of the acyl chain. All double bonds, except where noted, are in the cis configuration.

Electrophysiological recording and analysis

Voltage-activated currents were recorded from individual taste receptor cells maintained in the taste bud using the whole-cell patch clamp configuration, as generally described in Hamill et al., "Improved Patch-clamp Techniques for High-resolution Current Recording from Cells and Cell-free Membrane Patches," Pflügers Arch., Vol. 391, pp. 85–100 (1981). Patch pipettes were made by pulling mlcrohematocrit tubes (Scientific Products, McGaw Park, Ill.) on a Flaming/Brown micropipette puller (model P-97; Sutter Instrument Co., Novato, Calif.), and subsequently firepolishing on a microforge (model MF-9; Narishige, Tokyo) to a resistance between 5 and 10 MΩ when filled with intracellular solution.

Typical seal resistances on TRC membranes ranged from I to greater than 50 GΩ. Mean input resistance in the whole cell configuration was 2.07±0.91 GΩ, mean TRC resting potential was −56.3±7.7 mV, and mean cell capacitance was 10.8±2.6 pF (n=72). Series resistance and cell capacitance were compensated optimally prior to recording voltage-activated currents. Families of current records were obtained by holding the cells at −80 mV and stepping to potentials between −130 mV and +40 mV in 10 mV increments. Commands were delivered and data recorded using pCLAMP software (version 6.0.3) interfaced to an AxoPatch 200A amplifier with a Digidata 1200A A-D board (Axon Instruments, Foster City, Calif.). Data were collected at 10 KHz and filtered on-line at 2 KHz.

For analysis, currents during FFA application were averaged over a consistent time range corresponding to the steady-state condition, and were compared to currents in control (Tyrode's) solution. Tyrode's solution was perfused between each application of FFAs, continuing until currents returned to near-pretreatment levels. For analysis of delayed rectifying $K^+$ channels, currents were measured at command potentials of +40 mV during steady-state; inwardly rectifying currents, when investigated, were measured at −130 mV. Significant effects of FFAs on $K^+$ currents were determined by paired Student's t tests ($\alpha$=0.05) compared to control currents immediately preceding the test stimulus.

All data are presented as mean ± standard deviation, unless otherwise indicated.

EXAMPLE 1

Effects of arachidonic acid on $K^+$ currents in fungiform taste receptor cells.

The extracellular application of arachidonic acid (0.25–100 μM) had profound effects on outward voltage-activated $K^+$ currents in rat fungiform taste receptor cells ("TRCs"). The most evident effect of arachidonic acid was a reversible, slowly developing inhibition of the delayed rectifier $K^+$ channel; this effect was observed in all cells examined. On average, 10 μM arachidonic acid inhibited 83% of the voltage-activated steady-state outward $K^+$ current at +40 mV (n=44 cells). The remaining outward voltage-activated current during arachidonic acid treatment likely reflected currents through two additional types of $K^+$ channels. Part of the residual current was carried through inactivating A-type $K^+$ channels ($I_A$); 4-aminopyridine (4-AP, 10 mM) reversibly and completely inhibited this rapidly inactivating current (n=10 cells). Time constants for inactivation of the outward $K^+$ current in the absence and presence of 10 μM arachidonic acid were 457±103 msec (n=20) and 42±26 msec (n=20), respectively, consistent with this interpretation. A portion of the outward current was associated with ATP-inhibitable K channel ($K_{ATP}$) activity; glyburide (20 μM) blocked the residual current in the presence of arachidonic acid and 4-AP (n=6 cells). In the presence of arachidonic acid, 4-AP, and glyburide, over 96% of all outward currents were blocked (n=6 cells). In initial experiments the target of the FFA-sensitive inhibition had not been unequivocally identified. Because of this fact and the potential non-specific effects of 4-AP, 4-AP and glyburide were not routinely included in all experiments. Therefore, the estimates of the magnitude of specific FFA inhibition of the delayed rectifier are conservative.

In a subset of the cells (approximately 30% of the total), concurrent with the inhibition of the delayed rectifier, 10 μM arachidonic acid also activated inwardly rectifying $K^+$ channels ($K_{ir}$). approximately doubling $K_{ir}$ over control levels (191%±19.7% compared to control at −130 mV; n=16 cells). Arachidonic acid was not able to activate $K_{ir}$ in cells that did not show this current in control (saline) conditions, suggesting that it acted to enhance $K_{ir}$, not to activate it. Inward currents in cells that did not show inward rectification at potentials more negative than −100 mV were not significantly affected by arachidonic acid (n=37 cells).

By contrast, effective FFAs inhibited delayed rectifying $K^+$ channels in every TRC examined.

EXAMPLES 2 AND 3

Time course and concentration-dependence of outward $K^+$ currents on arachidonic acid and linoleic acid.

In whole-cell recordings, onset of and recovery from the effects of arachidonic acid were comparatively slow, consistent with the hypothesis that arachidonic acid may have to diffuse across the plasma membrane to act intracellularly at the ion channels or closely associated proteins. Typically, the effects of arachidonic acid on outward $K^+$ currents were evident within 1 to 2 minutes, and took about 10–15 minutes to reach maximum levels. The mean time constant ($t_{on}$) for the onset of arachidonic acid effects at 10 μM was 4.37±1.8 min (n=18 cells). Recovery from inhibition by arachidonic acid was slower, with recovery time constants ($t_{off}$) of 10.92±5.9 min (n=18 cells).

To test the hypothesis that the FFAs were active only on the extracellular face of the membrane, 10 μM linoleic acid was included in the pipette (intracellular) solution, and voltage-activated current activity was recorded. Intracellular linoleic acid had no effect upon outward $K^+$ currents for tip to 30 min or more. But when linoleic acid was subsequently added extracellularly, outward $K^+$ currents were inhibited (n=11 cells). This observation suggested that FFAs act at an extracellular site.

Arachidonic acid inhibition of the delayed rectifier $K^+$ channel was concentration-dependent with an inhibition constant ($K_i$) of 1.02 $\mu$M.

Since arachidonic acid and linoleic acid inhibit $K^+$ currents in TRCs and these channels play crucial roles in repolarizing the cells following activity, the presence of such FFAs should affect how these cells respond during stimulus-induced activity. This prediction was tested in cells in current clamp mode during perfusion of saline, both in the absence and presence of 10 $\mu$M linoleic acid. In response to current injection (+18 pA), TRCs typically fired 0–3 action potentials, followed by a sustained depolarization lasting as long as the stimulus was present. Linoleic acid caused an increase in the magnitude of stimulus-induced depolarization of taste receptor cells, and caused a prolonged "tail" potential following termination of the stimulus, consistent with its effects on the ion channels. On average, the sustained depolarization during current injection (18 pA) in the rat fungiform taste receptor cells was 22.4±8.5 mV during perfusion of physiological saline (n=7 cells). Addition of 10 $\mu$M linoleic acid to the perfusate of the same cells increased the mean voltage response to 36.8±9.2 mV (n=7), an increase of 64%.

EXAMPLES 4–21

Specificity of FFA inhibition of delayed rectifying $K^+$ channels.

The effects of other FFAs on $K^+$ channels has also been tested. These experiments examined the modulation of the delayed rectifier $K^+$ channel with different fatty acids varying in chain length, bond position and geometry, and degree of unsaturation. These FFAs (Table 1, above) were tested at concentrations from 10–100 $\mu$M under the conditions as otherwise described above for arachidonic acid. Because of the limited number of TRCs exhibiting $K_{ir}$ in control conditions (see above), only data for the inhibition of the delayed rectifying $K^+$ current were statistically analyzed.

Significant effects were seen in fatty acids with two or more double bonds, at least one of which is in the cis confirmation (cis-polyunsaturated fatty acids or "PUFAs"). Measurements of current were made once the FFA (10 $\mu$M) had exerted its maximal effect (>10 min). Only cis-polyunsaturated FFAs (linoleic, linolenic, arachidonic, eicosapentaenoic and docosahexaenoic acid; Table 1) significantly reduced outward $K^+$ currents. Monounsaturated FFAs (palmitoleic, oleic, erucic and nervonic acid, Table 1) did not have significant effects. The trans-polyunsaturated FFAs (linolelaidic and linolenelaidic acid) also had no effect on outward $K^+$ currents. Also, saturated FFAs did not inhibit outward $K^+$ currents, even at concentrations up to 100 $\mu$M. No significant effects were observed for FFA chain length or bond position (e.g. n-3 vs. n-6 FFAs).

Though not statistically significant, there appeared to be a general trend indicating that the greater the degree of unsaturation, the more rapid and potent were the effects on both types of K+currents. An exception was linoleic acid (18 carbons, 2 double bonds; C18:2), the most potent of the FFAs tested. There appeared to be no dependence on the position of the double bonds (e.g. n-3 vs. n-6 FFAs; Table 1).

The potencies of the effective PUFAs were not related to their relative partition coefficients across the cell membrane, suggesting that diffusion was not a limiting factor in effectiveness, and consistent with the hypothesis that other PUFAs, like linoleic acid, are effective only when applied extracellularly. FFAs with only trans double bonds (linolelaidic acid, linolenelaidic acid; Table 1) did not significantly affect outward $K^+$ currents. The charged or polar carboxyl group of a fatty acid appeared to be important; arachidonic acid methyl ester was ineffective in modulating TRC $K^+$ currents (n=5 cells). Though not extensively investigated, the enhancement of $K_{ir}$ by FFAs was also apparently limited to PUFAs; the monounsaturated FFA oleic acid did not enhance $K_{ir}$ (n=5 cells).

In contrast to the polyunsaturated fatty acids, saturated fatty acids (10–25 $\mu$M) did not affect the activity of ion channels in isolated TRCs. In all cells, saturated fatty acids varying in chain length from 6 to 20 carbons (Table 1) were ineffective in significantly modulating either delayed rectifying or inwardly rectifying $K^+$ channels.

Without intending to limit the scope of this invention, it is believed that the following examples of other cis-polyunsaturated fatty acids will also be effective in the present invention: the diastereomers of linoleic acid ((E,Z)-9,12-octadecadienoic acid and (Z,E)-9,12-octadecadienoic acid) (C18:2), octadecatetraenoic acid (C18:4), eicosadienoic acid (C20:2), eicosatrienoic acid (C20:3), docosadienoic acid (C22:2), docosatrienoic acid (C22:3), docosatetraenoic acid (C22:4), and docosapentaenoic acid (C22:5).

EXAMPLE 22

Effects on the delayed rectifier are consistent with a direct action on the ion channel.

The delayed effects of arachidonic acid and linoleic acid were not due to the time course of activating either the lipoxygenase pathway or the cyclooxygenase pathway. Arachidonic acid inhibited the delayed rectifier $K^+$ channel in TRCs treated with the lipoxygenase inhibitor nordihydroguaiaretic acid (NDGA; 10 $\mu$M) and the cyclooxygenase inhibitor indomethacin (200 $\mu$M; n=5 cells). Furthermore, FFA-induced inhibition of the delayed rectifier $K^+$ channel did not require activation of G proteins. Inclusion of 0.5 mM guanosine 5'-O-(2-thiodiphosphate), a nonhydrolyzable inhibitor of G protein activation by GTP, in the patch pipette did not inhibit the effects of FFA on outward currents in TRCs (n=5). Any involvement of protein kinase C (PKC) and protein kinase A (PKA) in these effects has also been ruled out. Intracellular application of 25 $\mu$M HA-100 (Calbiochem, La Jolla, Calif.), which inhibits both PKC and PKA in the low micromolar range, did not prevent linoleic acid-induced inhibition of outward $K^+$ currents (n=6 cells). Inhibition of outward $K^+$ currents by FFAs also did not involve the cytochrome P450 pathway. TRCs treated for 15 min with the P450 inhibitor metyrapone (1 mM) were still inhibited by linoleic acid in a quantitatively similar fashion (n=6 cells). However, metyrapone alone inhibited 23.8±9.7% of the outward current (n=6 cells), suggesting some constitutive activation of the cytochrome P450 pathway in TRCs.

EXAMPLE 23

To determine if there is a link between the sensitivity of TRCs to PUFAs and dietary fat preferences, the PUFA-sensitivities of TRCs using patch clamp techniques were compared on TRCs isolated from Osborne-Mendel ("O-M") rats and S5B/P1 rats, strains with different dietary preferences. O-M rats prefer fat over carbohydrate, while S5B/P1 rats prefer carbohydrate over fat. The PUFAs, linoleic acid (C18:2), linolenic acid (C18:3), and arachidonic acid (C20:4), inhibited the delayed rectifying $K^+$ channels in a concentration-dependent manner in both strains, while the unsaturated lauric acid (C12:0) was ineffective. The delayed rectifying K$^+$ channels from strain S5B/P1 TRCs were significantly more sensitive to inhibition by all 3 PUFAs (10 $\mu$M) than were TRCs from O-M rats. These data are consistent with an inverse correlation between peripheral gustatory sensitivity to PUFAs and dietary preference for fat. Rats whose TRCs were more sensitive to the fatty acids have a preference for a lower-fat diet; while rats whose TRCs are less sensitive to fatty acids seek diets that are higher in fat.

EXAMPLES 24 and 25

Cis-polyunsaturated fatty acids are combined with various food items and fed to mammals to stimulate taste receptors. As shown above, docosahexaenoic, eicosapentaenoic, arachidonic, linolenic, and linoleic acids, for example, stimulate taste receptor cells.

It is preferred that the concentration of the added cis-polyunsaturated fatty acid be greater than the concentration of the same cis-polyunsaturated fatty acid that is present in the food, if any, prior to adding the cis-polyunsaturated fatty acid. The total concentration of the cis-polyunsaturated fatty acid present in the food, following adding the cis-polyunsaturated fatty acid, should be effective to substantially enhance the taste sensation of the food as compared to the taste sensation of the same food without the added cis-polyunsaturated fatty acid. It is preferred that the addition of the cis-polyunsaturated fatty acid to the food not be accompanied by contemporaneously adding to the food a substantial concentration of a saturated fatty acid. It is preferred that the addition of the cis-polyunsaturated fatty acid to the food not be accompanied by contemporaneously adding to the food a substantial concentration of a monounsaturated fatty acid or a trans-polyunsaturated fatty acid.

Cis-polyunsaturated fatty acids, preferably in concentrations about 10 $\mu$M, will be combined with fat substitutes to enhance their palatability. While not limiting the scope of this invention, 30 examples of such fat substitutes include those based on sucrose polyesters (olestra and similar compounds), trehalose, raffinose, sorbitol, stachyose polyester, alkyl glycoside polyester, sucrose ester, alkyl glycoside ester, structured triacylglycerols, esterified propoxylated glycerol, dialkyl dihexadecylmalonate, trialkoxytricarballylate, trialkoxycitrate, trialkoxyglycerylether, and polyglycerol esters.

Cis-polyunsaturated fatty acids will also be added to other food products to enhance the taste sensation for other stimuli, especially the sweet stimuli. These fatty acids will be combined with sweet food products, preferably in concentrations about 10 $\mu$M, to enhance the sensation of the sweet taste. While not limiting the scope of this invention, examples of such sweeteners include sucrose, saccharin, cyclamate, and aspartame.

As used in the specification and claims, an "effective" concentration of a cis-polyunsaturated fatty acid in a food is a concentration sufficient to substantially enhance the taste sensation of the food as compared to the taste sensation of the same food without the added cis-polyunsaturated fatty acid.

As used in the specification and claims, a "cis-polyunsaturated fatty acid" is a fatty acid having at least two carbon—carbon double bonds, at least one of which is in the cis confirmation. The presence of one or more trans carbon—carbon double bonds in the fatty acid is not necessarily excluded, so long as there is at least one cis carbon—carbon double bond.

As used in the specification and claims, a "trans-polyunsaturated fatty acid" is a fatty acid having at least two carbon—carbon double bonds, all of which are in the trans confirmation, and none of which are in the cis conformation.

It is preferred that all carbon—carbon double bonds be in the cis conformation. It is preferred that none of the carbon—carbon double bonds be conjugated. It is preferred that the number of carbon atoms in the fatty acid be 18, 20, or 22, because smaller fatty acids tend to be less stable, larger fatty acids occur naturally only rarely, and fatty acids having an odd number of carbon atoms occur naturally only rarely.

Thus the preferred fatty acids for use in this invention may be generically described as unconjugated, all-cis, octadecapolyenoic fatty acids; unconjugated, all-cis, eicosapolyenoic fatty acids; and unconjugated, all-cis, docosapolyenoic fatty acids.

The complete disclosures of all references cited in this specification are hereby incorporated by reference. Also incorporated by reference is the complete disclosure of the following unpublished manuscript: T. Gilbertson et al., "Fatty Acid Modulation of K$^+$ Channels in Taste Receptor Cells: Gustatory Cues for Dietary Fat," submitted to American Journal of Physiology: Cell Physiology, 1996. In the event of an otherwise irreconcilable conflict, however, the present specification shall control.

I claim:

1. A method for enhancing the stimulation of a taste receptor cell by a food, comprising adding to the food a free cis-polyunsaturated fatty acid, wherein:

(a) the concentration of the added free cis-polyunsaturated fatty acid is greater than the concentration of the same free cis-polyunsaturated fatty acid that is present in the food, if any, prior to said adding of the free cis-polyunsaturated fatty acid;

(b) the total concentration of the free cis-polyunsaturated fatty acid present in the food, following said adding of the free cis-polyunsaturated fatty acid, is effective to substantially enhance the stimulation of the taste receptor cell as compared to the stimulation of a taste receptor cell by the same food without the added free cis-polyunsaturated fatty acid; and (c) said adding of the free cis-polyunsaturated fatty acid to the food is not accompanied by the contemporaneous adding to the food of a substantial concentration of a saturated fatty acid.

2. A method as recited in claim 1, wherein said adding of the free cis-polyunsaturated fatty acid to the food is not accompanied by the contemporaneous adding to the food of a substantial concentration of a free monounsaturated fatty acid or a free trans-polyunsaturated fatty acid.

3. A method as recited in claim 1, wherein the free cis-polyunsaturated fatty acid is added in a concentration between about 0.1 $\mu$M and about 100 $\mu$M.

4. A method as recited in claim 1, wherein the free cis-polyunsaturated fatty acid is added in a concentration between about 1 $\mu$M and about 10 $\mu$M.

5. A method as recited in claim 1, wherein the free cis-polyunsaturated fatty acid is added in a concentration of about 10 $\mu$M.

6. A method as recited in claim 1, wherein the free cis-polyunsaturated fatty acid is selected from the group consisting of linoleic acid, linolenic acid, docosahexaenoic acid, eicosapentaenoic acid, and arachidonic acid.

7. A method as recited in claim 1, wherein the free cis-polyunsaturated fatty acid is linoleic acid.

8. A method as recited in claim 1, wherein the free cis-polyunsaturated fatty acid is linolenic acid.

9. A method as recited in claim 1, wherein the free cis-polyunsaturated fatty acid is docosahexaenoic acid.

10. A method as recited in claim 1, wherein the free cis-polyunsaturated fatty acid is eicosapentaenoic acid.

11. A method as recited in claim 1, wherein the free cis-polyunsaturated fatty acid is arachidonic acid.

12. A method as recited in claim 1, wherein the free cis-polyunsaturated fatty acid is selected from the group consisting of unconjugated, all-cis, octadecapolyenoic fatty acids; unconjugated, all-cis, eicosapolyenoic fatty acids; and unconjugated, all-cis, docosapolyenoic fatty acids.

13. A method as recited in claim 1, wherein the food comprises a fat substitute, and wherein adding the free cis-polyunsaturated fatty acid enhances the taste sensation of fat.

14. A method as recited in claim 13, wherein the fat substitute is selected from the group consisting of olestra, sucrose polyesters other than olestra, trehalose, raffinose, sorbitol, stachyose polyester, alkyl glycoside polyester, sucrose ester, alkyl glycoside ester, structured triacylglycerols, esterified propoxylated glycerol, dialkyl dihexadecylmalonate, trialkoxytricarballylate, trialkoxycitrate, trialkoxyglycerylether, and polyglycerol esters.

15. A method as recited in claim 13, wherein the fat substitute comprises olestra.

16. A method as recited in claim 1, wherein the food comprises a sugar or a sugar substitute, and wherein adding the free cis-polyunsaturated fatty acid enhances the taste sensation of sweetness.

17. A method as recited in claim 16, wherein the sugar or sugar substitute comprises sucrose.

18. A method as recited in claim 16, wherein the sugar or sugar substitute comprises saccharin.

19. A method as recited in claim 16, wherein the sugar or sugar substitute comprises aspartame.

20. A method as recited in claim 16, wherein the sugar or sugar substitute comprises cyclamate.

* * * * *